3,290,373
4,4'-METHYLENEDIIMINO-BIS-BENZALCANOLAMIDES

Max Hoffer, Nutley, N.J., assignor to Hoffmann-La Roche Inc., Nutley, N.J., a corporation of New Jersey
No Drawing. Filed Nov. 26, 1963, Ser. No. 326,265
5 Claims. (Cl. 260—559)

This invention relates, in general, to novel compounds and to the production and use thereof. More particularly, the invention relates to a new class of benzalcanolamide compounds, to a process for producing the same and to the use of such compounds in hair grooming preparations.

The novel compounds of this invention are 4,4'-methylenediimino-bis-benzalcanolamides having the formula:

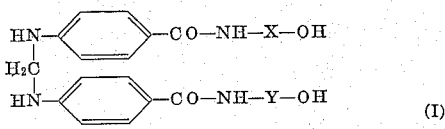

(I)

in which the symbol X represents an alkylene group, either straight or branch chain, having a carbon chain length of from 2 to 4 carbon atoms and in which the symbol Y represents an alkylene group, either straight or branch chain, having a carbon chain length of from 2 to 4 carbon atoms.

Thus, for example, representative of the alkylene groups which are depicted in Formula I by the symbols X and Y are methyl, ethyl, propyl, isopropyl, butyl, isobutyl, etc. radicals. The groups which are represented by the symbols X and Y may be the same or they may be different.

The compounds of Formula I, while relatively insoluble in water, are soluble in various inert organic solvents. It has been found that when these compounds are embodied into organic solvents of the type normally employed in formulating hair grooming preparations and when, subsequently, the solvent is removed, for example, by evaporation, a glossy, pliable film is formed. This characteristic of the present products renders them well suited for use as an ingredient in hair grooming compositions.

The novel compounds of Formula I are readily prepared. In general, the preferred preparative method comprises effecting a solution of a p-aminobenzalcanolamide having the formula:

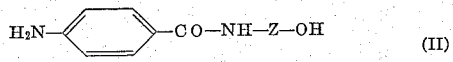

(II)

in which the symbol Z represents an alkylene group, either straight or branch chain, having a carbon chain length of from 2 to 4 carbon atoms.

and evaporating such solution in the presence of formaldehyde. If desired, a mixture of Formula II compounds can be used, one of such compounds having one alkylene group and the other compound having another alkylene group as the Z residue. In carrying out this invention, the Formula II compound, or compounds, and formaldehyde should be used in such quantities to provide a ratio of at least one mole of formaldehyde for each two moles of the Formula II compound.

The p-aminobenzalcanolamides of Formula II, which compounds are used as the starting materials in the practice of this invention are, for the most part, new compounds. An exception to this is p-amino - N - (2-hydroxyethyl)-benzamide, which compound is described in J.A.C.S. 73, 5557 (1951). In general, the remaining starting materials of this invention, all of which are novel, are prepared by the catalytic hydrogenation of the correspondingly substituted p - nitrobenzalcanolamides.

Such hydrogenation reaction, ordinarily, is carried out in the presence of a suitable solvent. As the solvent, one can use, for example, water; a lower molecular weight aliphatic alcohol such as ethanol, methanol, isopropanol, etc.; an ester, such as ethyl acetate; or a mixture of any of the foregoing solvents.

Thus, in the practice of this invention, there can be used, as the Formula II starting material, p-amino - N - (2-hydroxyethyl)-benzamide; 4-amino - N - (2-hydroxy-1,1-dimethylethyl)-benzamide; p-amino - N - (2-hydroxypropyl) - benzamide; p - amino-N-(3 - hydroxypropyl)-benzamide; etc. As indicated heretofore, the starting material is first dissolved in a suitable solvent. In general, one can use any solvent in which the Formula II starting material is soluble. Preferably, however, a lower molecular weight aliphatic alcohol is employed as the solvent in the process. Thus, for example, methanol, ethanol, butanol, isobutanol, etc. are well suited for use. The process is not, however, restricted to the use of an alcohol solvent. If desired, the starting p-aminobenzalcanolamide compound of Formula II can be dissolved instead in water or in an organic solvent such as dioxane, acetone or ethyl acetate. Thereafter, formaldehyde, preferably in the form of an aqueous solution, is added to the organic solvent solution of p-aminobenzalcanolamide. In an alternate procedure, the Formula II starting material can be added to, and dissolved in, a solvent into which the formaldehyde reactant was previously, or is concurrently, added. Thereafter, and regardless of sequence in which the reactants are introduced into the reaction vessel, the reaction mixture is heated at an elevated temperature to effect removal of the solvent and bring about the desired condensation.

The amount of solvent which is removed in the heating step of the process is variable. For example, the condensation reaction can be effected by evaporating the reaction mixture to dryness. On the other hand, the same result can be achieved by removing an even lesser quantity of solvent. In such an embodiment of the invention, the reaction product can be precipitated from the concentrated reaction solution by the gradual addition of a non-solvent for the reaction product, for example, by the gradual addition of water. In the latter procedure, the reaction mixture will be evaporated, under normal circumstances, to at least about one-half of its volume prior to effecting the precipitation of the compound.

From the foregoing description, it will be appreciated that the temperature at which the present procedure is carried out can be varied within rather wide limits. Generally, however, the condensation reaction, with the concurrent removal of solvent, will be effected at a temperature which is at or near the boiling point of the reaction mixture.

The compounds of Formula I have been found to be well-suited for use as the hair-set component of hair grooming compositions. These compounds, form a film on the hair shaft, which film keeps the hair in a set position and makes it more easily manageable. The manner in which the compounds of the present invention are employed in the formulation of hair grooming compositions will be readily apparent to those skilled in the art. Generally, however, these hair grooming compositions will contain the present compounds in admixture with conventional adjuvant materials, such as, perfumes, antistatic agents, plasticizing agents, emulsifying agents, auxiliary hair conditioning agents, coloring agents, solvents, etc. Such a mixture can be mixed with a liquified fluorinated hydrocarbon propellant and, subsequently, packaged into a suitable dispenser or container by any known or convenient method. As the liquidified fluorinated hydrocarbon propellant, one can use those products marketed by E. I. du Pont de Nemours and Co., Wilmington, Delaware, under the proprietary designation "Freon"; or those products marketed by Allied Chemical and Dye Corporation, New York, New York, under the proprietary designation "Genetron"; and those marketed by Pennsalt Chemicals Corporation, Philadelphia, Pennsylvania, under the proprietary designation "Isotron." Useful as propellants are mixtures of various "Freon" products, for example, "Freon" 11 (trichloromonofluoromethane), "Freon" 12 (dichlorodifluoromethane) and "Freon" 114 (symmetrical dichlorotetrafluoromethane). Especially useful are mixtures of "Freon" 11 and "Freon" 12 and mixtures of "Freon" 12 and "Freon" 114 in the proportions recommended by the manufacturer for pressure ranges of 12 to 60 p.s.i.g.

For a fuller understanding of the nature and objects of this invention, reference may be had to the following examples which are given merely as further illustrations of the invention and are not to be construed in a limiting sense.

*Example 1*

In this example, 15.0 grams of p-amino-N-(2-hydroxyethyl)benzamide were heated at a temperature within the range of from about 70° C. to about 80° C. with 100 ml. of ethanol and 5 ml. of 30% aqueous formaldehyde solution. Heating of this mixture was continued until, by evaporation, it had undergone a reduction to one-half of its original volume. Thereafter, the reaction product was precipitated by the gradual addition of 50 ml. of water to the mixture. The precipitated product crystallized in the course of several days. The crystalline product, namely, 4,4'-methylenediimino-bis-[N - (2-hydroxyethyl)benzamide] melted at a temperature of 174° to 176° C. The product was soluble in dilute hydrochloric acid and it was precipitated unchanged from the hydrochloric acid solution using ammonia.

The 4,4' - methylenediimino-bis-[N-(2 - hydroxyethyl)benzamide] produced as described in the preceding paragraph was formulated into a hair spray composition in the following manner:

A concentrate was prepared using the following ingredients in the proportions hereinafter indicated:

| | Percent |
|---|---|
| 4,4'-methylenediimino-bis-[N-(2-hydroxyethyl)benzamide] | 1.00 |
| Polyoxyethylene sorbitan monolaurate | 0.10 |
| 1,3,6-hexanetriol | 0.02 |
| Perfume | 0.15 |
| Anhydrous ethyl alcohol | 48.73 |

This concentrate was filled into aerosol cans and a mixture of "Freon" 11 and "Freon" 12 (60/40) was added thereto to make 100%. The filling procedure used was the so-called "cold-fill" method of packaging. In this method, the concentrate was cooled to a temperature of about 0° C., prior to its introduction into the aerosol container. The propellent, previously cooled to a temperature of about −10° C., was then added to the container, following which the container was tightly closed with a lid having a suitable valve through which the product, in the form of a spray, could be dispensed.

Evaluation of the hair spray composition, which was produced as described in the preceding paragraph, revealed it to have highly effective hair setting characteristics.

*Example 2*

In this example, 20.0 grams of 4-amino-N-(2-hydroxy-1,1-dimethylethyl)benzamide were dissolved in 100 ml. of hot ethyl alcohol. Thereafter, 5.0 ml. of 30% aqueous formaldehyde solution was added to the alcoholic solution and the clear solution which was thus obtained was evaporated to dryness in vacuo. There was formed a foamy glass which consisted essentially of 4,4'-methylenediimino-bis-[N - (2-hydroxy-1,1-dimethylethyl)benzamide].

The 4 - amino-N-(2-hydroxy-1,1-dimethylethyl)benzamide which was used as the starting material in this example was prepared in the following manner: 61.0 grams of p-nitro - N - (2-hydroxy-1,1-dimethylethyl)benzamide were hydrogenated in 400 ml. of ethanol at a temperature within the range of from about 20° to 80° C. and under a pressure of 600 to 800 lbs. The hydrogenation reaction was effected using palladium-charcoal as a catalyst. When the hydrogenation reaction was completed, the catalyst was removed from the reaction mixture by filtration and the clear solution was evaporated to dryness in vacuo. The residue, upon crystallation from acetone, yielded 4-amino-N-(2-hydroxy-1,1-dimethylethyl)benzamide melting at 134° to 135° C.

The p-nitro-N-(2-hydroxy-1,1-dimethylethyl)benzamide which was used in the process described in the preceding paragraph was prepared in the following manner: 37.0 grams of p-nitrobenzoyl chloride were added to 35.6 grams of commercial 2-amino-2-methyl-1-propanol at a temperature within the range of from about 60° to 70° C. This addition was accomplished at such a rate that the temperature of the reaction mixture did not rise above about 130° C. When the addition of the p-nitrobenzoyl chloride was completed, the reaction mixture was maintained at a temperature of 120° to 130° C. for a period of about 10 minutes. Thereafter, the reaction mixture was allowed to cool to a temperature below about 100° C., following which it was added to, and stirred with, 200 ml. of water.

A precipitate was thus formed which crystallized rapidly. The crystalline product was collected from the reaction mixture by filtration. Upon recrystallization from 60% aqueous ethanol there was obtained p-nitro-N-(2-hydroxy-1,1-dimethylethyl)benzamide melting at a temperature of from about 118° to 120° C.

*Example 3*

In this example, 25 grams of p-amino-N-(2-hydroxypropyl)benzamide, melting at 133° C., were heated in 100 ml. of ethyl alcohol in the presence of 10 ml. of 30% aqueous formaldehyde. Upon evaporation in vacuo there was obtained a blistery, foamy glass consisting substantially of 4,4'-methylenediimino - bis-[N - (2-hydroxypropyl)benzamide].

The p-amino-N-(2 - hydroxypropyl)benzamide which was used as the starting material in this example was prepared by the hydrogenation of 74 grams of p-nitro-N-(2-hydroxypropyl)benzamide in 400 ml. of alcohol at a temperature of from 20° C. to 80° C. and a pressure of 500 to 700 p.s.i. The hydrogenation reaction was effected using palladium-charcoal as the catalyst. After the uptake of hydrogen had been completed, the catalyst was removed by filtration and the clear, colorless solution thus obtained was evaporated to dryness. The residue was crystallized from acetone-ether to yield p-amino-N-(hydroxypropyl)benzamide melting at 133° C.

*Example 4*

In this example, 70 grams of p-nitro-N-(3-hydroxypropyl)benzamide were hydrogenated in 400 ml. of ethyl alcohol at a temperature within the range of from about 20° to 80° C. and a pressure of 500 to 700 p.s.i. using palladium-charcoal catalyst. When the uptake of hydrogenation was completed the palladium-charcoal catalyst was removed by filtration. The filtrate consisted essentially of p - amino - N - (3-hydroxypropyl)benzamide. Thereafter, 30 ml. of 30% aqueous formaldehyde solution were added to the filtrate and the solution was evaporated to dryness in vacuo.

By this procedure there was obtained a clear, blistery glass which consisted essentially of 4,4'-methylenediimino-bis-[N-(3-hydroxypropyl)benzamide].

Example 5

In this example, 9.0 grams of p-amino-N-(2-hydroxyethyl)benzamide and 10.4 grams of p-amino-N-(2-hydroxy-1,1-dimethylethyl)benzamide were dissolved in 100 ml. of heated ethyl alcohol. Thereafter, 5 ml. of 30% aqueous formaldehyde was added thereto. The resulting mixture was evaporated in vacuo, yielding a blistery glass containing N-(2-hydroxyethyl)-N'-(2-hydroxy-1,1-dimethylethyl)-4,4'-methylenediimino dibenzamide in admixture with 4,4'-methylenediimino-bis-[N-(2-hydroxyethyl)benzamide] and 4,4'-methylenediimino-bis-[N-(2-hydroxy-1,1-dimethylethyl)benzamide].

I claim:
1. A compound of the formula:

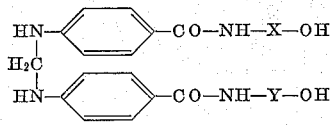

in which X is an alkylene group having a carbon chain length of from 2 to 4 carbon atoms and in which Y is an alkylene group having a carbon chain length of from 2 to 4 carbon atoms.

2. 4,4' - methylenediimino - bis - [N - (2 - hydroxyethyl)benzamide].
3. 4,4' - methylenediimino - bis - [N - (2-hydroxy-1,1-dimethylethyl)benzamide].
4. 4,4' - methylenediimino - bis - [N - (2 - hydroxypropyl)benzamide].
5. 4,4' - methylenediimino - bis - [N - (3-hydroxypropyl)benzamide].

References Cited by the Examiner

UNITED STATES PATENTS 2,551,647  5/1951  Steiger _____ 260—559

OTHER REFERENCES

Berg, Jour. Chem. Society (London), 1960, pages 5172–73 relied on.

Phillips, Jour. Amer. Chem. Soc., vol. 73, pages 5557–59 (1951).

Reasenberg et al., Jour. Amer. Chem. Soc., vol. 66, pages 991-4 (1944).

WALTER A. MODANCE, *Primary Examiner.*

N. TROUSOF, *Assistant Examiner.*